United States Patent [19]
Powell

[11] Patent Number: 5,799,407
[45] Date of Patent: Sep. 1, 1998

[54] FLEXIBLE MEASURING DEVICE

[76] Inventor: Gary T. Powell, Belin Village, Avoca, Pa. 18641

[21] Appl. No.: 669,107

[22] Filed: Jun. 24, 1996

[51] Int. Cl.⁶ ........................................ G01B 3/10
[52] U.S. Cl. .................. 33/555.4; 33/483; 33/484; 33/542; 33/544
[58] Field of Search ..................... 33/555.4, 483, 33/484, 485, 493, 494, 542, 544, 542.1, 543.1, 561.1, 561.2, 302, 403, 700

[56] References Cited

U.S. PATENT DOCUMENTS

| | | |
|---|---|---|
| 448,805 | 3/1891 | Adler ............................ 33/493 |
| 2,262,664 | 11/1941 | Bresson . |
| 2,313,920 | 3/1943 | Campbell ....................... 33/484 |
| 3,032,151 | 5/1962 | Allen et al. . |
| 3,407,507 | 10/1968 | Brubaker . |
| 3,724,083 | 4/1973 | Mehl ............................ 33/561.2 |
| 4,214,369 | 7/1980 | Wasik et al. . |
| 4,459,754 | 7/1984 | Yasuda et al. . |
| 4,835,876 | 6/1989 | Petermann et al. ............. 33/304 |
| 4,922,622 | 5/1990 | Galloway . |
| 5,103,571 | 4/1992 | Richards . |
| 5,171,248 | 12/1992 | Ellis ............................. 33/542.1 |
| 5,286,972 | 2/1994 | Falk et al. . |
| 5,406,715 | 4/1995 | Koizumi et al. . |
| 5,452,523 | 9/1995 | Jansen . |

FOREIGN PATENT DOCUMENTS

1509584  9/1989  U.S.S.R. ....................... 33/483

Primary Examiner—Christopher W. Fulton
Attorney, Agent, or Firm—Litman, McMahon, & Brown, L.L.C.

[57] ABSTRACT

A measuring device includes a generally tubular, flexible body with opposite ends and a longitudinally-extending bore. The body includes a plurality of measuring indicia at regularly-spaced intervals therealong. It can be selectively mounted on the body ends and have a predetermined length which corresponds to the measuring indicia spacing. An extension connector is also provided for connecting two measuring device bodies together. A centering assembly has a sleeve which receives the body and wings projecting radially outwardly therefrom for generally centering the measuring device within a pipe bore.

8 Claims, 6 Drawing Sheets

FLEXIBLE MEASURING DEVICE

BACKGROUND OF THE INVENTION

1. Field of the Invention

The present invention relates generally to measuring devices, and in particular to a measuring device for measuring curvilinear distances, such as the length of a pipe run with curves.

2. Description of the Related Art

Measuring devices are well known and various types thereof have heretofore been proposed for meeting the requirements of particular applications. Common examples of measuring devices include rigid instruments such as rulers, yard sticks, and the like which are adaptable for measuring linear distances. Flexible measuring devices are also available and include elongated components which can be coiled for storage and extended as needed, such as tape measures and the like. Such measuring devices typically include flexible tapes which are marked at predetermined intervals with length-indicating indicia, such as transverse lines and numerals which indicate distance from a predetermined starting point, such as the end of the tape.

Previous measuring devices have tended to be somewhat limited in their applications. For example, rigid measuring devices such as rulers, yardsticks and the like are adaptable for measuring relatively short, straight distances. Tape measures, on the other hand, have the advantage of compactness in their coiled configurations and thus can be adapted to measure relatively long distances. However, tape measures with steel tapes are not particularly well-suited for following the curved configurations of objects being measured. For example, the length of a run of piping or ducting can often be determined by extending a measuring device through the bore or passage thereof. In order to pass a measuring device through a pipe or duct run, the measuring device requires a certain amount of stiffness, together with flexibility to accommodate curves and turns. Moreover, the length of such a pipe or duct run should be determined along a central, longitudinal axis thereof equally spaced from the sidewalls. However, previous measuring devices would tend to lay against the sidewalls over considerable distances, thus distorting the actual distances of the runs.

Previous measuring devices were not particularly well-suited for insertion into devices being measured in a manner which would maintain the accuracy of the resulting measurements. Moreover, previous measuring devices tended to be fixed in length without appropriate means for extending their lengths or for coupling several of them together.

The present invention addresses some of these disadvantages with previous measuring devices. Heretofore, there has not been available a measuring device with the advantages of the present invention.

SUMMARY OF THE INVENTION

In the practice of the present invention, a flexible measuring device is provided which includes a body with a generally tubular configuration, opposite ends and a bore extending longitudinally therethrough. The body is provided with measuring indicia at pre-determined, spaced intervals along its length. End caps are provided for mounting on the body ends and have predetermined lengths which coordinate with the measuring indicia spacing along the body. Multiple measuring device bodies can be joined together by extension connectors which are selectively mountable on the body ends and have predetermined lengths for maintaining the spacing of the measuring indicia across multiple measuring device bodies joined together at their ends by the extension connectors. A centering assembly includes a sleeve which slidably receives the body. The centering assembly includes a plurality of wings extending radially outwardly from the body for generally centering it within the bore of a pipe being measured. An alternative embodiment of the measuring device includes a transparent, tubular body with a measuring indicia strip positioned therein and having the measuring indicia printed thereon and visible through the transparent body. Carrying and storage cases for the measuring device are provided.

OBJECTS AND ADVANTAGES OF THE INVENTION

The principle objects and advantages of the present invention include: providing a flexible measuring device; providing such a measuring device which includes a generally tubular body; providing such a measuring device with recessed measuring indicia positioned along the body at regularly-spaced intervals; providing such a measuring device with end caps for selective mounting on the body ends; providing such a measuring device with an extension connector for connecting an additional body to the measuring device body for extending the measuring device overall length; providing such a measuring device which includes one or more centering assemblies for generally centering the measuring device within a pipe bore; providing such a measuring device which is well-suited for curvilinear distance measuring; providing such a measuring device which is adapted for measuring a wide variety of objects; providing such a measuring device which is adapted for extending through the bores and passages of pipes, ducts and the like for measuring the lengths of their runs; provides such a measuring device which can be extended by coupling multiple bodies thereof together; and providing such a measuring device which is economical to manufacture, efficient in operation, capable of a long operating life, and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

3

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 7:
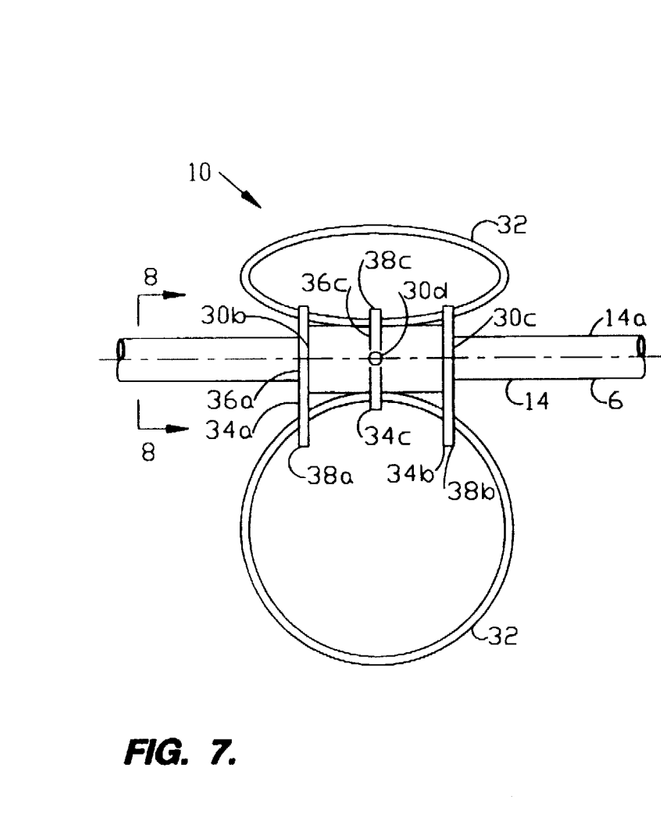
FIG. 7 is an elevational view of a centering assembly thereof.
Figure 8:
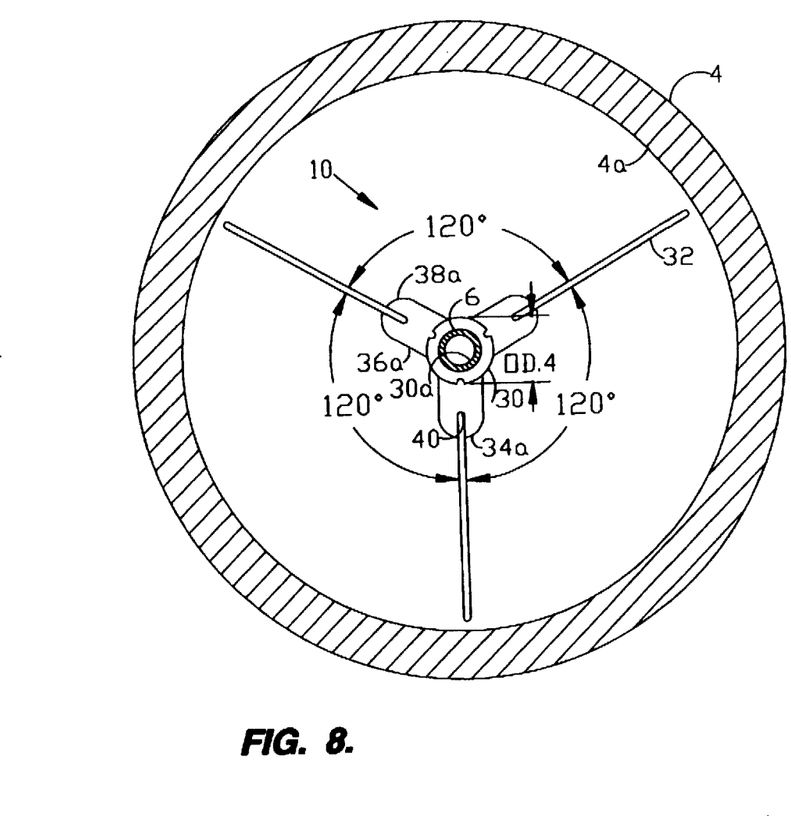
FIG. 8 is a cross-sectional view of the body and an end elevational view of the centering assembly, taken generally along line 8—8 in FIG. 7 and shown in the bore of a pipe being measured.
Figure 9:
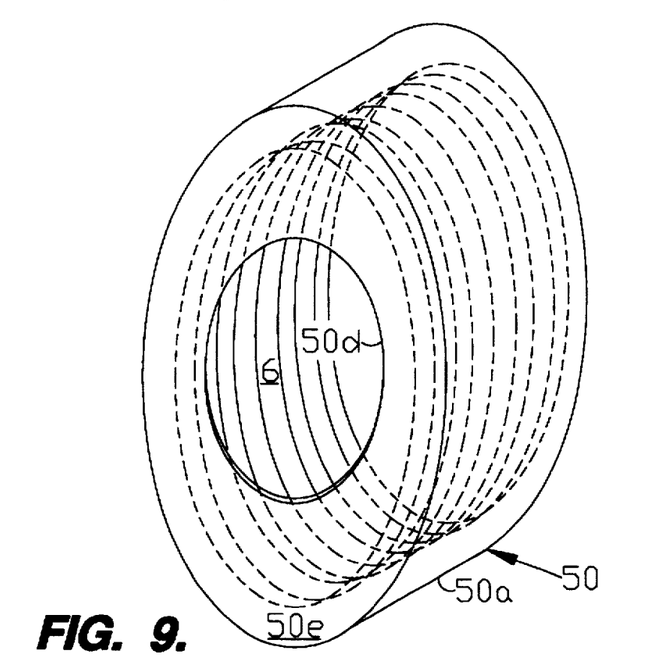
FIG. 9 is a prospective view of a carrying and storage case for the measuring device.
Figure 10:
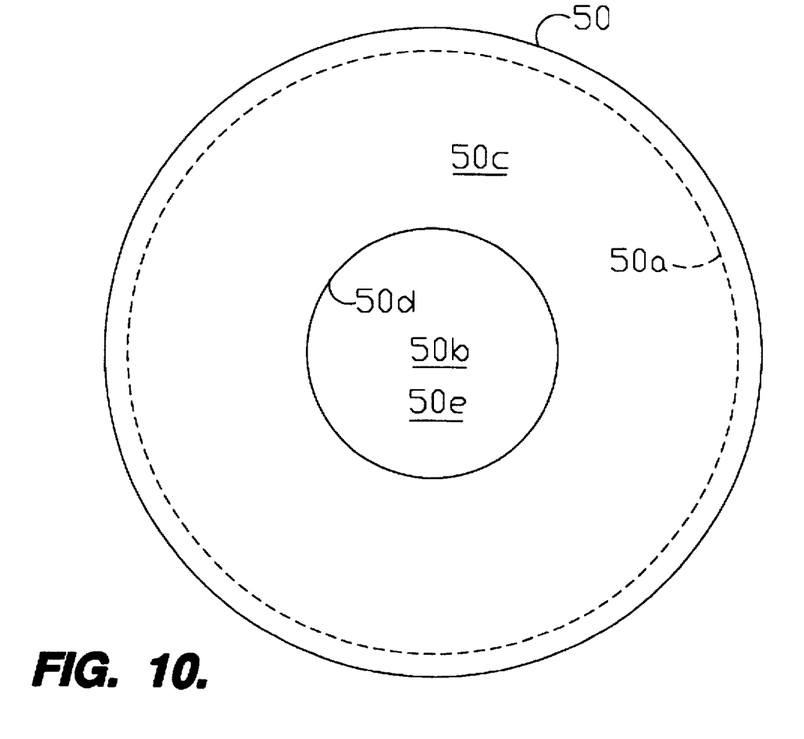
FIG. 10 is an end elevational view thereof.

Referring to the drawings in more detail, the reference numeral 2 generally designates a measuring device embodying the present invention. Without limitation on the generality of useful applications of the measuring device 2, it is adaptable for measuring distances through curves of various configurations and associated with various objects. For example, a pipe 4 is shown which includes a hollow bore 4a with the measuring device 2 therein (FIGS. 7 and 8). The measuring device 2 generally includes a body 6, an end attachment system 8, centering means comprising a centering assembly 10, and a carrying/storage case 50 or 60.

II. Body 6

The body 6 has a generally tubular configuration with opposite first and second ends 12a,b; a sidewall 14 with a generally cylindrical outer surface 14a; and a coaxial, longitudinally-extending bore 16. The bore 16 is open at the ends 12a,b. The body 6 can be formed by extrusion or by any other suitable means. A round cross-sectional body 6 is illustrated, but square, oval, hexagonal, triangular or other cross-sectional shapes, solid or hollow, could be used.

Figure 1:
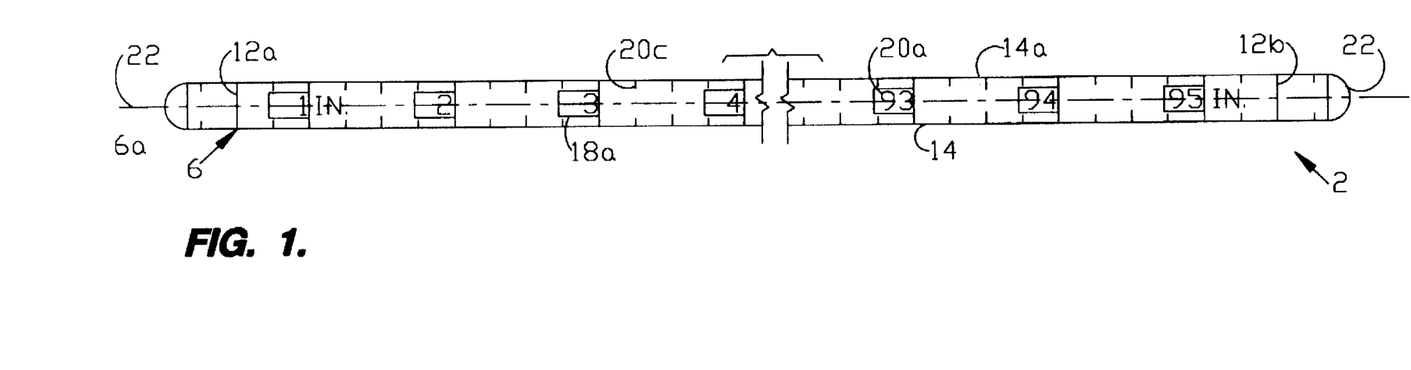
FIG. 1 is a fragmentary, side-elevational view of a flexible measuring device embodying the present invention, showing the side thereof marked with inches.
Figure 2:
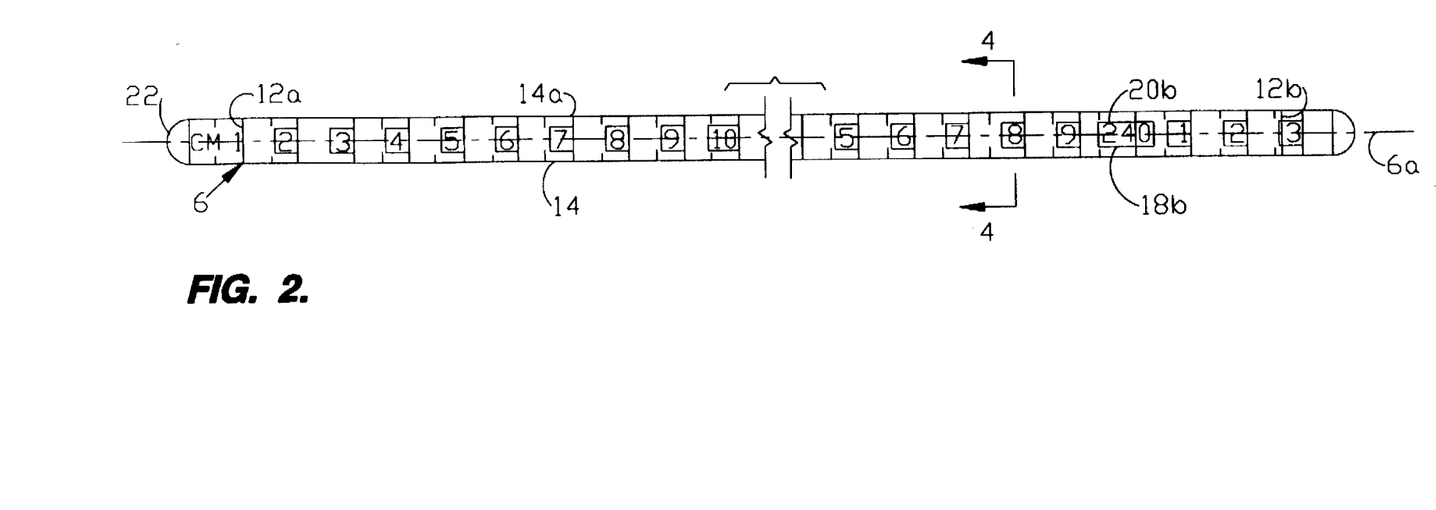
FIG. 2 is a fragmentary, side-elevational view thereof showing the side marked with centimeters.
Figure 3:
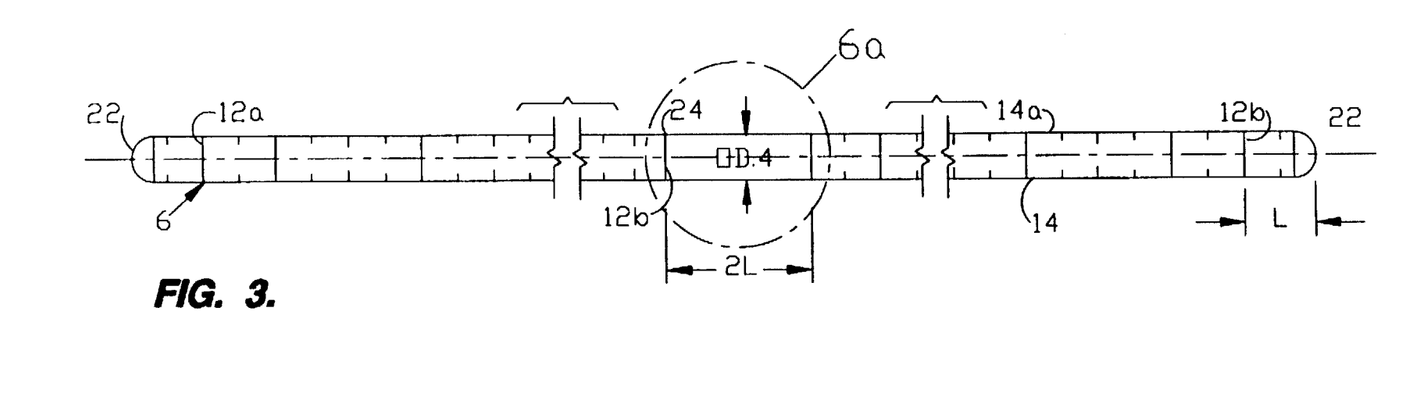
FIG. 3 is a side-elevational view thereof, showing two bodies coupled by an extension connector.
Figure 4:
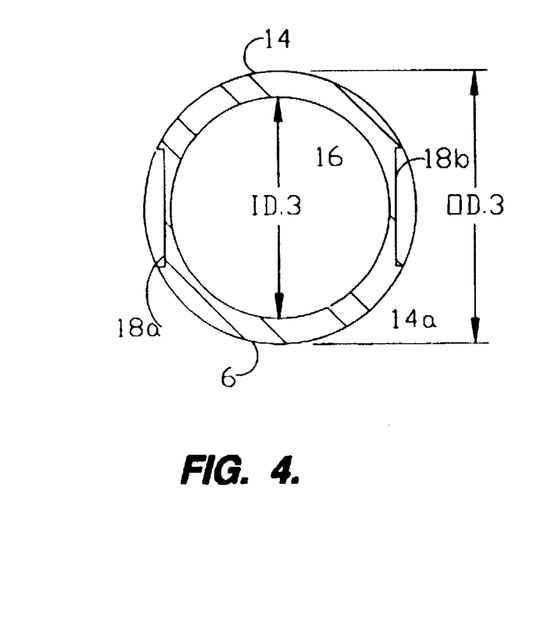
FIG. 4 is an enlarged, vertical, cross-sectional view thereof, taken generally along line 4—4 in FIG. 2.

Each side of the body 6 includes a longitudinally-spaced series of recessed flats 18a, 18b which are located at regularly-spaced intervals and are embossed with English or standard unit indicia (i.e. numerals corresponding to inches) 20a and metric unit indicia (i.e. numerals corresponding to centimeters) 20b respectively. Measuring marks 20c are provided at appropriate intervals. Alternatively, different systems of units for distance measuring can be employed and additional or alternative indicia can be embossed on the body 6.

The style, size and spacing of the embossed indicia 20 can be adapted to the requirements of particular applications of the measuring device 2.

III. End Attachment System 8

The end attachment system 8 generally includes a plurality of end caps 22 for mounting on and capping the body ends 12a, 12b and one or more extension connectors 24 for joining two or more bodies 6 to provide measuring devices 2 of various overall lengths.

Figures 5, 6:
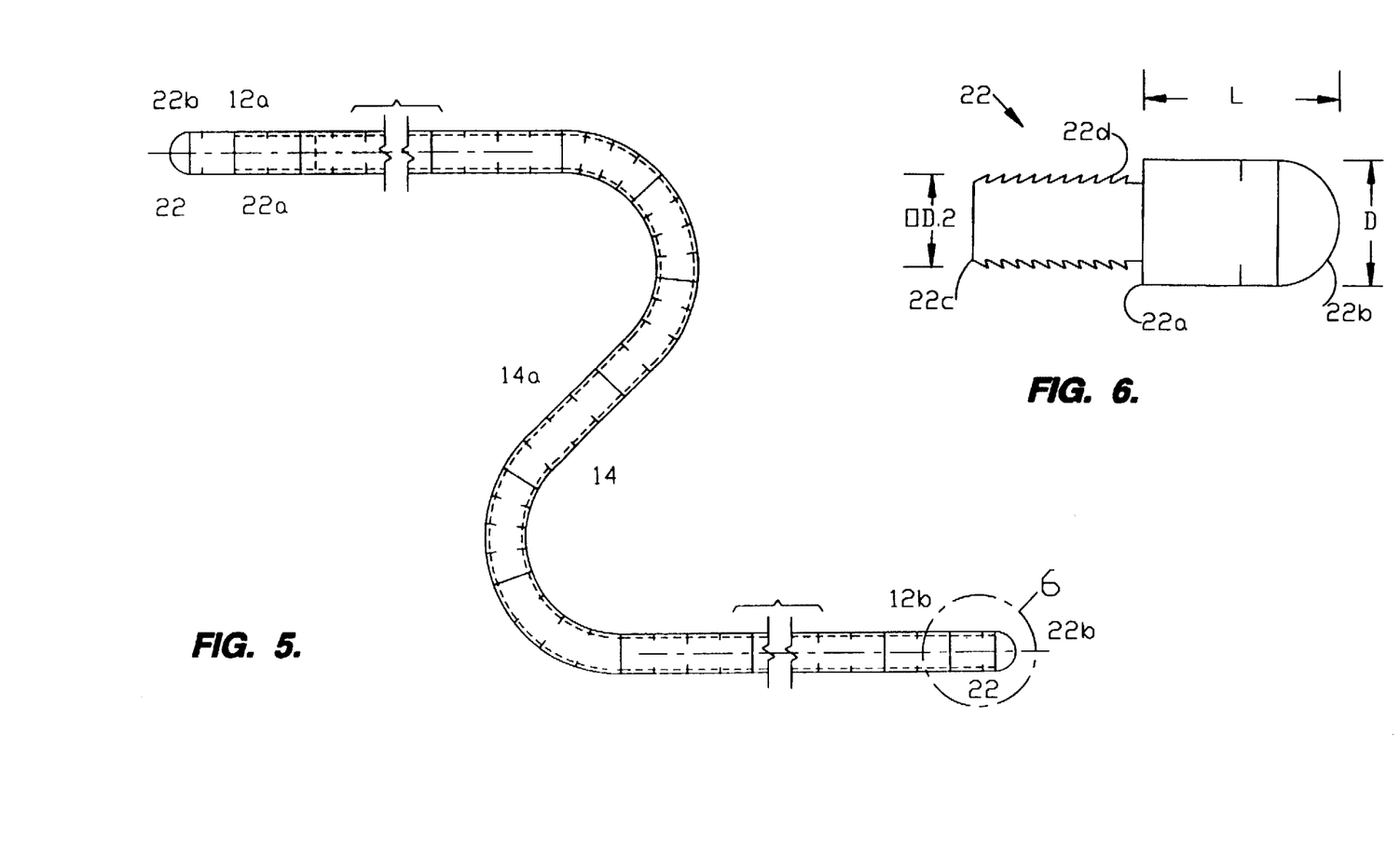
FIG. 5 is a fragmentary, side-elevational view thereof showing the flexible measuring device bent in a serpentine pattern.
FIG. 6 is an enlarged, side-elevational view of an end cap thereof, generally showing the area within circle 6 in FIG. 5.

Each end cap 22 includes a generally flat proximate end 22a, a rounded distal end 22b and a ringed shank 22c protruding from the proximate end 22a in longitudinal alignment with the end cap 22 and having a plurality of annular ridges 22d. Each end cap 22d has an effective length L as measured from its proximate end 22a to its distal end 22b and a diameter D as measured at its proximate end 22a. The end cap diameter D substantially corresponds to an outside diameter OD.1 of the body 6. The shank 22c is adapted to be snugly received in the body bore 16 at a body end 12a,b whereby the overall outer diameter OD.2 of the shank 22c is slightly greater than the inside diameter ID of the body bore 16. Alternatively, the end cap shanks 22c can be threaded for insertion into the body bore 16. The body bore 16 can be smooth and can secure the end cap shanks frictionally or it can be threaded at the body ends 12a,b.

Figure 6A:
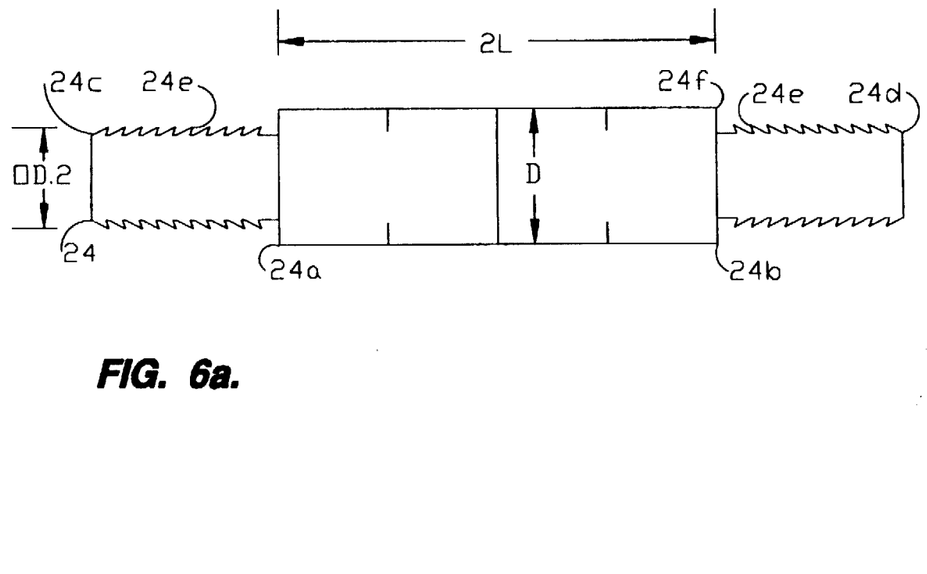
FIG. 6a is an enlarged, side-elevational view of an extension connector thereof, generally showing the area within circle 6a in FIG. 3.

Each extension connector 24 includes first and second opposite ends 24a,b; first and second extension connector shanks 24c,d extending from the extension connector ends 24a,b; and multiple, annular ridges 24e formed on the shanks 24c,d. The extension connectors 24 are mounted on the body ends 12a,b in the same manner as the end caps 22, i.e., by frictionally or threadably inserting the shanks 24c into the body bore 16 until the extension connector ends 24a,b engage the body ends 12a,b. An extension cover body 24f has a length 2L between the extension connector ends 24a,b which is twice the length L of the end caps 22. Connecting two bodies 6 by an extension connector 24 has the same effect as abutting a pair of end caps 22 mounted on them. The spacing of the indicia 20 is thus maintained by the end attachment system 8. The extension connector 24 has an outside diameter OD.3 which is substantially equal to OD.1 of the body 6 for relatively flush alignment with the body sidewall outer surface 14a and the end caps 22.

IV. Centering Assembly 10

The measuring device 2 can be provided with one or more centering assemblies 10 mounted on the body 6. Each centering assembly 10 includes a sleeve 30 which telescopically receives the body 6 and has a sleeve passage 30a forming a sleeve inside diameter ID.2. The sleeve 30 has opposite ends 30b,c and is adapted for fastening on the body by a friction fit, by a pin 30d or by some other suitable fastening means, such as adhesive, friction fit, welding, etc.

A plurality of centering rings 32 are mounted on the body 30, each lying in a respective plane extending radially outwardly from the body longitudinal axis 6a at spaced intervals of, for example, 120°. The rings can comprise a wire or some other suitable material with sufficient rigidity. Each ring is mounted on the body by opposite end arms 34a,b and a center arm 34c. The arms 34a,b,c have respective proximate ends 36a,b,c fixably mounted on the body 30 and rounded, distal ends 38a,b,c with receivers 40 receiving respective rings 32.

The number of rings 32 can vary to meet the requirements of particular applications. However, three rings 32 at 120° radial intervals are generally sufficient for maintaining the measuring device 2 generally within the center of a pipe bore (e.g. pipe bore 4a, FIG. 8) or some other structure being measured. The number of centering assemblies 10 can likewise be varied to meet the requirements of particular applications. For example, in pipes with relatively large numbers of curves, elbows, bends, etc., a correspondingly larger number of centering assemblies 10 could be utilized. Conversely, a relatively straight run of pipe would require fewer centering assemblies 10 over a comparable length.

V. Operation

The measuring device 2 is adaptable for measuring distances of various configurations, including multiple curves, on the insides and outsides of objects being measured. For example, the measuring device 2 could be used to find the circumference of a pipe or some other similar round object. Piping runs, duct runs, wiring runs, conduit runs, and the like can be laid out and installed with the use of the measuring device 2. A single length with one body 6 can be used with one or two end caps 22, or multiple bodies 6 can be joined together with the extension connectors 24. Extensions can be accomplished relatively quickly by inserting the shanks 24c,d of the extension connectors 24 into the body bores 16 at their respective ends 12a,b.

The measuring device 2 is adapted for measuring the length of a pipe 4 by threading it through the pipe bore 4a and maintaining the body 6 in position by the use of the centering assemblies 10. Upon inserting the measuring device 2 into a pipe bore 4a, the rings 32 will tend to guide the device 2 with the body 6 thereof substantially centered along the longitudinal axis of pipe 4. The circular rings 32 further facilitate insertion of the measuring device 2 in the pipe bore 4a because the rounded configurations of the rings 32 tend to reduce the likelihood that the measuring device 2 will catch or bind within the pipe bore 4a. Moreover, the rings 32 can be made of a relatively flexible material so that they have a certain amount of give upon encountering the sidewall of the pipe 4 within the pipe bore 4a.

The measuring device 2 can be coiled for storage and placed in a suitable storage or carrying case 50, such as that shown in FIG. 8. The carrying case 50 is generally cylindrical with a sidewall 50a, a closed end 50b, an open end 50c with an opening 50d formed therein and an interior 50e. The measuring device 2 can be placed in the case interior 50e by inserting it through the opening 50d and coiling it against the case sidewall 60a. The measuring device 2 can be withdrawn from the case 50 by grasping a body end 12a, 12b and pulling a desired length of the measuring device 2 out of the case 50 through the opening 50d. The case 50 can be formed of plastic or some other suitable material.

Figure 11:
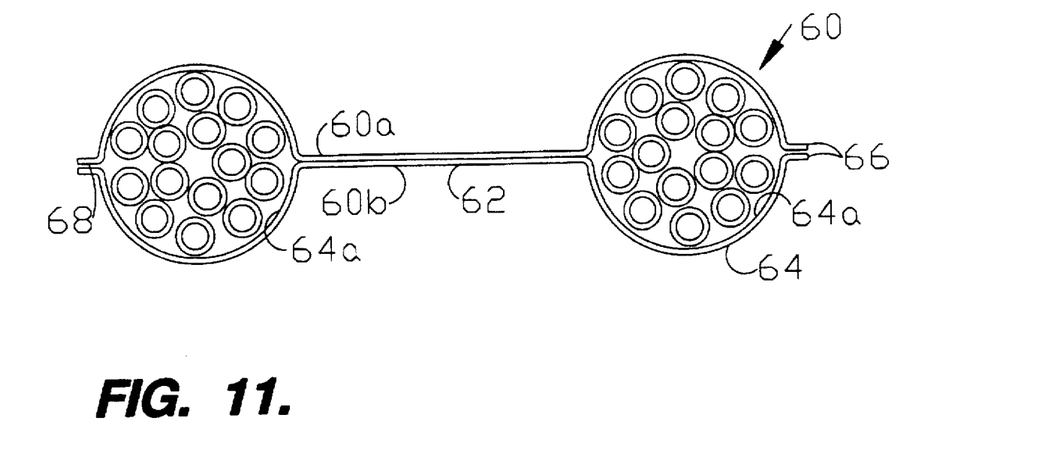
FIG. 11 is a vertical, cross-sectional view of an alternative embodiment of a carrying and storage case for the measuring device.
Figure 12:
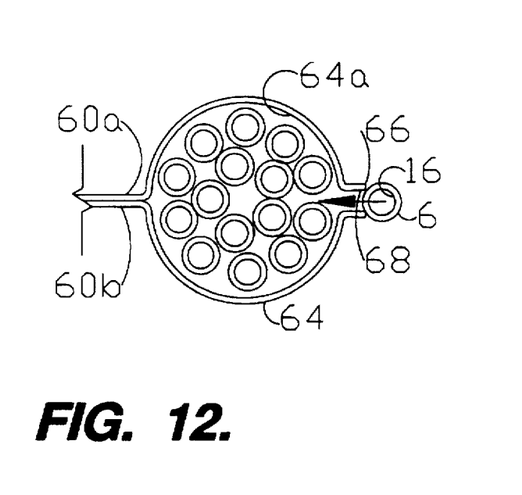
FIG. 12 is a fragmentary, cross-sectional view thereof, particularly showing the measuring device being inserted into the carrying and storage case therefor.
Figure 13:
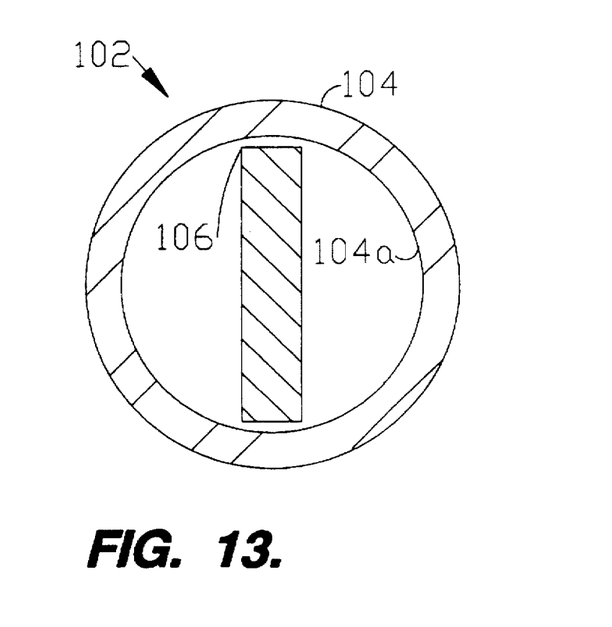
FIG. 13 is an enlarged, vertical, cross-sectional view of a measuring device comprising a first modified or alternative embodiment of the present invention with a measuring indicia strip positioned within a transparent, tubular body.

An alternative carrying case for the measuring device 2 is shown in FIGS. 11–13 and is designated by the reference numeral 60. The case 60 has the general configuration of a torroid with a flat, circular center panel 62 surrounded by a torroid-shaped tube 64 with a pair of perimeter flanges 66 forming an access slot 68 therebetween through which the measuring device 2 can be inserted by spreading first and second halves 60a,b of the case 60. The measuring device 2 can be coiled within a passage 64a of the tube 64.

In use, the recessed flats whereon the measuring indicia are embossed are less susceptible to wear than the body outer surface. For example, threading the measuring device 2 through a pipe bore or sliding same along a curved surfacing measure could subject the body outer surface to wear, particularly if the object being measured comprises an abrasive material. The measuring indicia, being recessed, are thus somewhat protected form wear and abrasion. Since the body 4 is flexible in all directions with respect to its longitudinal axis, it is well adapted for measuring multiple and compound curves.

VI. Alternative Embodiment Measuring Device 102

An alternative embodiment measuring device 102 (FIG. 13) includes a body 104 comprising a length of clear, hollow, transparent plastic tubing. The body 104 includes a bore 104a extending longitudinally therethrough and open at the body ends 12a, 12b.

An indicia strip 106 is located within the body bore 104a and includes opposite indicia strip ends which terminate in spaced relation from the body ends. The alternative embodiment measuring device 102 includes an end connection system comprising end caps which are similar to the end caps 12 described above and extensions connectors which are likewise similar to the extension connectors 24 described above. The measuring indicia strip 106 can thus be retained in place relative to the body 104 by engagement at its ends with the end cap 22 and the extension connector 24. The measuring indicia strip 106 is thus visible through the transparent body 104. The measuring indicia strip 106 can be provided with standard (inches) indicia on one side and metric indicia on the other. Alternatively, different measuring indicia strips can be placed in the body bore 104a as required for particular applications. For example, a measuring strip indicia for determining a number of units, such as courses of brick, tile, etc., could be provided. Another application for a specialized indicia would be a designation of stud spacing within a stud wall at, for example, 16 inches on center. Other specialized measuring indicia strips could be provided.

It is to be understood that while certain forms of the present invention have been illustrated and described herein, it is not to be limited to the specific forms or arrangement of parts described and shown.

What is claimed and desired to be secured by Letters Patent is as follows:

1. A flexible measuring device, which comprises:
   (a) a generally tubular, flexible, longitudinal body with opposite ends;
   (b) measuring indicia means located at predetermined, evenly-spaced intervals along said body;
   (c) an end cap mounted on a respective body end and adding a predetermined length to said body to provide an overall predetermined length of said measuring device;
   (d) said body being flexible throughout substantially its entire length with respect to its longitudinal axis; and
   (e) centering means for generally centering said body within a bore being measured.

2. The measuring device according to claim 1 wherein said centering means comprises a centering assembly, which includes:
   (a) a centering assembly sleeve; and
   (b) a plurality of radially extending wings each mounted on said sleeve and extending radially outwardly therefrom.

3. The measuring device according to claim 2 wherein said centering assembly includes:
   (a) each said wing having a wire loop and being connected to said sleeve by a pair of loop mounting flanges each mounted on said sleeve and extending radially outwardly therefrom.

4. The measuring device according to claim 3, which includes:
a) a carrying and storage case having a torroid-shaped tube with a torroid-shaped passage therethrough and a perimeter access slot into said tube passage.

5. The measuring device according to claim 4 wherein said carrying and storage case includes:
a) a generally circular center within said tube;
b) a pair of annular, perimeter flanges forming said access slot therebetween; and
c) first and second case halves joined at said center and each including one of said perimeter flanges.

6. A measuring device for measuring a tubular device with a bore, which includes:
(a) a body with opposite ends;
(b) measuring indicia means comprising a plurality of longitudinally-spaced indicia on said body;
(c) each said body end having a receiver extending inwardly therefrom;
(d) a pair of end caps each having a proximate end engaging a respective body end, a shank with annular ridges extending from said distal end and received in a respective body end receiver, and a rounded distal end; and
(e) body centering means comprising:
1) a centering means sleeve with opposite ends and a passage receiving said body;
2) a pair of wings each extending radially outwardly from said sleeve; and
3) centering assembly mounting means mounting said sleeve on said body.

7. A flexible measuring device system, which includes:
a) a plurality of bodies, each including:
1) opposite ends;
2) a longitudinally extending bore open at said ends;
3) a sidewall with an outer surface;
4) a plurality of recessed flats on said sidewall at regularly-spaced intervals and recessed from said sidewall outer surface;
5) a longitudinal axis;
6) a plurality of measuring indicia embossed on said recesses; and
7) a plurality of measuring marks each partially encircling said sidewall on said outer surface thereof;
b) a pair of end caps each having a proximate end engaging a respective body end, a ribbed shank extending from said proximate end and received in said body bore and a rounded distal end;
c) an extension connector having first and second ends each selectively engaging a respective body end and first and second ribbed shanks projecting from said first and second extension connector ends respectively and being selectively received in said body bore adjacent to respective body ends; and
d) a body centering assembly including:
1) a centering assembly sleeve with first and second ends and a passage extending therebetween, said centering assembly sleeve passage receiving one of said bodies;
2) centering assembly mounting means mounting said sleeve on a respective body;
3) a plurality of radially-spaaced first end mounting flanges mounted on said first sleeve end and extending radially outwardly therefrom;
4) a plurality of second end mounting flanges mounted on said sleeve second end and extending radially outwardly therefrom;
5) a plurality of center mounting flanges mounted on said sleeve between the ends thereof and extending radially outwardly therefrom; and
6) a plurality of centering assembly rings each mounted on first end, second end and center mounting flanges respectively, said rings generally lying within planes which intersect along said body longitudinal axis.

8. The measuring device system according to claim 7 which includes:
a) a carrying/storage case for carrying and storing said measuring device in a coiled configuration thereof.

* * * * *